(12) United States Patent
Shomura et al.

(10) Patent No.: US 8,960,348 B2
(45) Date of Patent: Feb. 24, 2015

(54) FOUR-WHEELED VEHICLE

(71) Applicant: Honda Motor Co., Ltd, Tokyo (JP)

(72) Inventors: Takaaki Shomura, Wako (JP); Tadashi Oshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/012,591

(22) Filed: Aug. 28, 2013

(65) Prior Publication Data

US 2014/0083790 A1    Mar. 27, 2014

(30) Foreign Application Priority Data

Sep. 27, 2012    (JP) ................................. 2012-214859

(51) Int. Cl.
| | |
|---|---|
| *F02M 35/00* | (2006.01) |
| *B60K 13/02* | (2006.01) |
| *B60K 5/00* | (2006.01) |
| *F02M 35/16* | (2006.01) |
| *F02M 35/04* | (2006.01) |
| *F02M 35/12* | (2006.01) |

(52) U.S. Cl.
CPC . *B60K 13/02* (2013.01); *B60K 5/00* (2013.01); *F02M 35/162* (2013.01); *F02M 35/048* (2013.01); *B60K 2005/003* (2013.01); *F02M 35/1266* (2013.01)
USPC ...................................................... 180/68.3

(58) Field of Classification Search
CPC ....... B60K 13/02; F02M 35/00; F02M 35/02; F02M 35/0201; F02M 35/04; F02M 35/048; F02M 35/162; F02B 2075/1808; F02B 75/26
USPC ....... 180/291, 68.3; 123/198 E, 58.1, 195 AC
See application file for complete search history.

(56) References Cited

U.S. PATENT DOCUMENTS

| | | | | |
|---|---|---|---|---|
| 5,636,608 | A * | 6/1997 | Shichinohe et al. ........ | 123/197.1 |
| 6,957,639 | B2 * | 10/2005 | Yamada et al. .......... | 123/195 AC |
| 7,168,516 | B2 * | 1/2007 | Nozaki et al. ................ | 180/68.3 |
| 7,287,619 | B2 * | 10/2007 | Tanaka et al. ................. | 180/291 |
| 7,506,712 | B2 * | 3/2009 | Kato et al. .................... | 180/68.3 |
| 7,588,010 | B2 * | 9/2009 | Mochizuki et al. ........ | 123/195 R |
| 7,712,562 | B2 * | 5/2010 | Nozaki ......................... | 180/68.3 |
| 7,757,655 | B2 * | 7/2010 | Inui et al. .................. | 123/195 R |
| 7,882,912 | B2 * | 2/2011 | Nozaki et al. ................ | 180/68.3 |
| 7,950,486 | B2 * | 5/2011 | Van Bronkhorst et al. ........................... | 180/89.11 |

(Continued)

FOREIGN PATENT DOCUMENTS

| | | | | |
|---|---|---|---|---|
| JP | 03125624 | A * | 5/1991 | ............... B60H 3/06 |
| JP | 2010-083272 | A | 4/2010 | |

*Primary Examiner* — J. Allen Shriver, II
*Assistant Examiner* — Steve Clemmons
(74) *Attorney, Agent, or Firm* — Westerman, Hattori, Daniels & Adrian, LLP (57) ABSTRACT

A four-wheeled vehicle is provided which increases and secures the volume of an air cleaner while avoiding increase in the number of components and reducing the influence of the air cleaner on other components. The vehicle is equipped with a driver seat and a passenger seat arranged on a vehicle body frame side by side in the vehicle width direction, and is equipped with an engine disposed on the vehicle body frame substantially at the center in the front-rear direction of the vehicle. An air cleaner, constituting a part of an intake device of the engine and formed in an elongated shape in the vehicle width direction, is disposed between the driver seat and the passenger seat.

3 Claims, 6 Drawing Sheets

(56) References Cited

U.S. PATENT DOCUMENTS

| | | | |
|---|---|---|---|
| 8,256,563 B2* | 9/2012 | Suzuki et al. | 180/292 |
| 8,381,855 B2* | 2/2013 | Suzuki et al. | 180/68.3 |
| 2004/0195019 A1* | 10/2004 | Kato et al. | 180/68.3 |
| 2007/0045016 A1* | 3/2007 | Nozaki | 180/69.2 |
| 2007/0045029 A1* | 3/2007 | Nozaki | 180/291 |
| 2007/0227491 A1* | 10/2007 | Mizuno et al. | 123/196 R |
| 2007/0227793 A1* | 10/2007 | Nozaki et al. | 180/68.3 |
| 2008/0015065 A1* | 1/2008 | Kato et al. | 474/8 |
| 2008/0289896 A1* | 11/2008 | Kosuge et al. | 180/312 |
| 2012/0031693 A1* | 2/2012 | Deckard et al. | 180/68.3 |
| 2012/0031694 A1* | 2/2012 | Deckard et al. | 180/68.3 |
| 2012/0305327 A1* | 12/2012 | Lambri et al. | 180/291 |
| 2013/0033070 A1* | 2/2013 | Kinsman et al. | 296/190.03 |
| 2013/0056292 A1* | 3/2013 | Kinsman et al. | 180/68.3 |
| 2013/0087396 A1* | 4/2013 | Itoo et al. | 180/68.3 |

* cited by examiner

FOUR-WHEELED VEHICLE

CROSS-REFERENCE TO RELATED APPLICATIONS

The present application claims priority under 35 U.S.C. §119 to Japanese Patent Application No. 2012-214859, filed Sep. 27, 2012, the contents of which are incorporated herein, by reference, in their entirety.

TECHNICAL FIELD

The present invention relates to a four-wheeled vehicle which is provided with a driver seat and a passenger seat arranged on a vehicle body frame side by side in the vehicle width direction, and is equipped with an internal combustion engine disposed on the vehicle body frame substantially at the center in the front-rear direction of the vehicle in a plan view, the vehicle body frame having a pair of left and right front wheels and a pair of left and right rear wheels suspended thereon.

BACKGROUND OF THE INVENTION

A rough terrain four-wheeled vehicle in which an air cleaner for its internal combustion engine is arranged in a spread layout in a rear part of the vehicle body so as to secure the volume of the air cleaner has been known from Japanese Patent Application Publication No. 2010-83272.

SUMMARY OF THE INVENTION

However, in the case of the configuration in which the air cleaner is arranged in a spread layout as disclosed in Japanese Patent Application Publication No. 2010-83272 listed above, the air cleaner not only increases the number of components but also easily affects the arrangement of other components.

A four-wheeled vehicle can increase and secure the volume of an air cleaner while avoiding increase in the number of components and reducing the influence of the air cleaner on other components.

A first aspect provides a four-wheeled vehicle which is provided with a driver seat and a passenger seat arranged on a vehicle body frame side by side in a vehicle width direction, and is equipped with an internal combustion engine disposed on the vehicle body frame substantially at a center in a front-rear direction of the vehicle in a plan view, the vehicle body frame having a pair of left and right front wheels and a pair of left and right rear wheels suspended thereon, wherein the driver seat and the passenger seat are disposed away from each other in the vehicle width direction, and an air cleaner constituting a part of an intake device of the internal combustion engine and formed in an elongated shape in the vehicle width direction is disposed between the driver seat and the passenger seat in the plan view.

Moreover, in addition to the configuration of the first aspect, a second aspect is such that an engine body of the internal combustion engine is disposed at a center in the vehicle width direction below the driver seat and the passenger seat.

In addition to the configuration of the second aspect, a third aspect is such that the driver seat and the passenger seat include seating parts and seatback parts rising upward from rear portions of the seating parts, respectively, and the air cleaner is disposed between the seatback parts of the driver seat and the passenger seat.

In addition to the configuration of the third aspect, a fourth aspect is such that a second passenger seat having a seatback part which is displaced forward of the seatback parts of the driver seat and the passenger seat is provided between the driver seat and the passenger seat.

In addition to the configuration of the third or fourth aspect, a fifth aspect is such that the engine body is mounted on the vehicle body frame in such a posture that the engine body is placed longitudinally with an axis of a crankshaft set along the front-rear direction and that a cylinder axis is tilted in the vehicle width direction toward any one of the driver seat and the passenger seat, and an intake port of the engine body is disposed closer to the other of the driver seat and the passenger seat than is a vertical plane extending along the center in the vehicle width direction, whereas an ambient-air intake port of the air cleaner is disposed closer to the one of the driver seat and the passenger seat than is the vertical plane.

Further, in addition to the configuration of the fifth aspect, a sixth aspect is such that an intake duct extending to a side portion of a vehicle body along the seatback part of the other of the driver seat and the passenger seat is connected to the ambient-air intake port of the air cleaner.

According to the first aspect, the air cleaner formed in the elongated shape is disposed between the driver seat and the passenger seat disposed away from each other. Accordingly, the volume of the air cleaner can be increased and secured without making the air cleaner affect peripheral components such as the front wheels, the rear wheels, and the suspensions and also without increasing the number of components.

Moreover, according to the second aspect, the engine body is disposed at the center in the vehicle width direction below the driver seat and the passenger seat. Thus, the distance between the engine body and the air cleaner is reduced, thereby shortening the intake passage. Accordingly, the size of the internal combustion engine as a whole can be reduced.

Moreover, according to the third aspect, the air cleaner is disposed between the seatback parts of the driver seat and the passenger seat. Thus, the space created between the seatback parts of the driver seat and the passenger seat is effectively utilized for disposing the air cleaner. Accordingly, the volume of the air cleaner can be increased.

Moreover, according to the fourth aspect, the second passenger seat is provided between the driver seat and the passenger seat, and the seatback part of the second passenger seat is displaced forward of the seatback parts of the driver seat and the passenger seat. Thus, the seatback parts of the driver seat, the passenger seat, and the second passenger seat form a recess sunk forwardly in the plan view, and the air cleaner is disposed in the recess. Hence, a dead space in the vehicle is effectively utilized for disposing the air cleaner. Accordingly, the volume of the air cleaner can be further increased.

Moreover, according to the fifth aspect, the intake port of the engine body and the ambient-air intake port of the air cleaner are disposed closer to the driver seat and the passenger seat than is the vertical plane extending along the center in the vehicle width direction, respectively. Thus, the air cleaner is elongated in the vehicle width direction between the seatback parts of the driver seat and the passenger seat. Accordingly, while the volume of the air cleaner is secured, the intake passage is bent to a lesser extent, thereby making it possible to improve the intake efficiency.

Moreover, according to the sixth aspect, the intake duct extending to the side portion of the vehicle body along the other of the seatback parts of the driver seat and the passenger seat—the seatback part closer to the ambient-air intake port of the air cleaner—is connected to the ambient-air intake port of the air cleaner. Thus, the intake duct is bent to a lesser extent, thereby making it possible to further enhance the intake efficiency.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present invention will be described with reference to the accompanying drawings FIGS. 1 to 6. Note that in the following description, front, rear, left, right, upper, and lower refer to directions based on the view of an occupant seated in a rough terrain four-wheeled vehicle.

Figure 1:
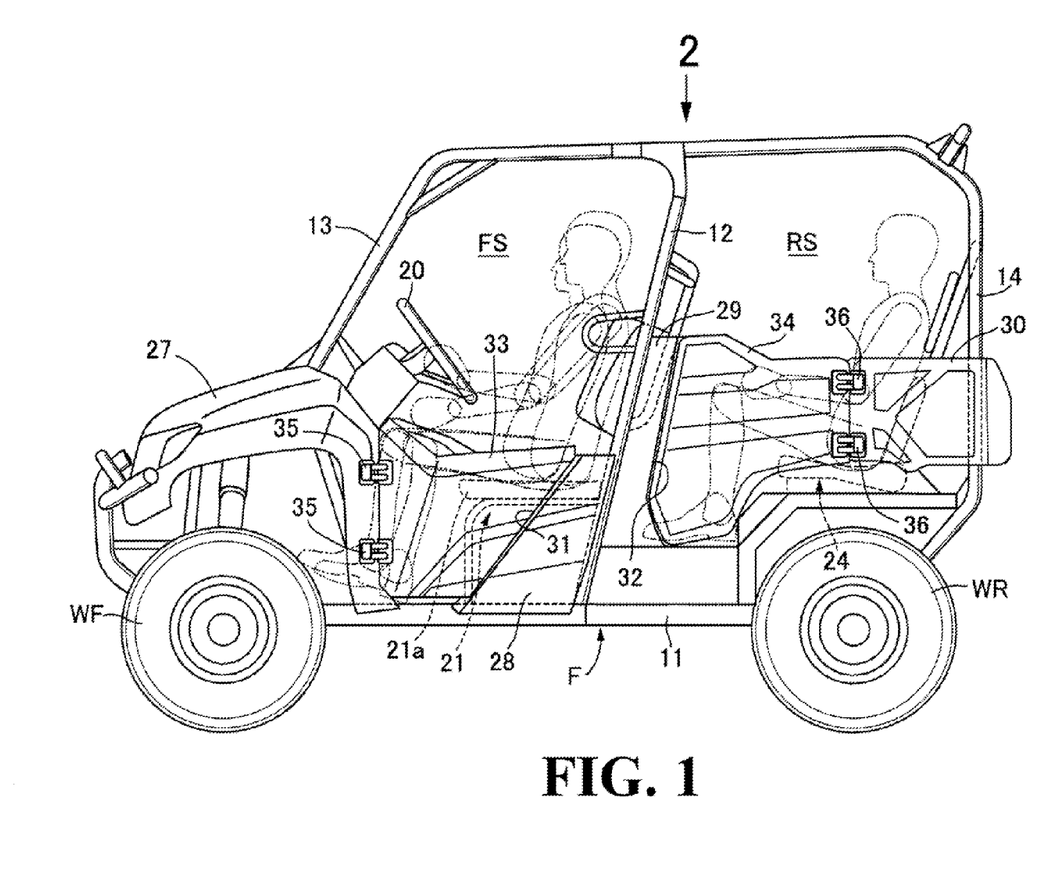
FIG. 1 is a side view of a rough terrain four-wheeled vehicle.
Figure 2:
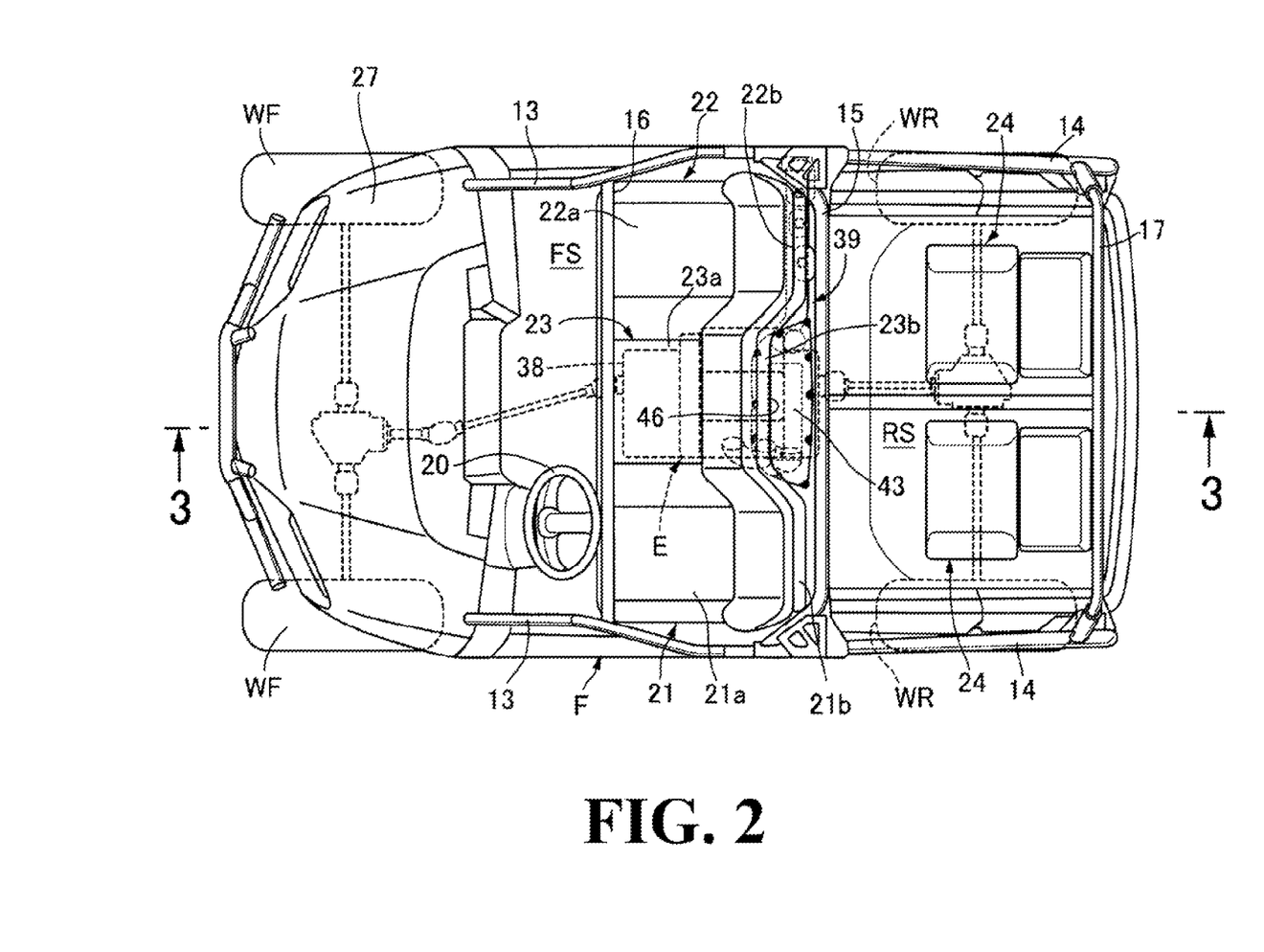
FIG. 2 is a plan view as seen in the direction of arrow 2 in FIG. 1.
Figure 3:
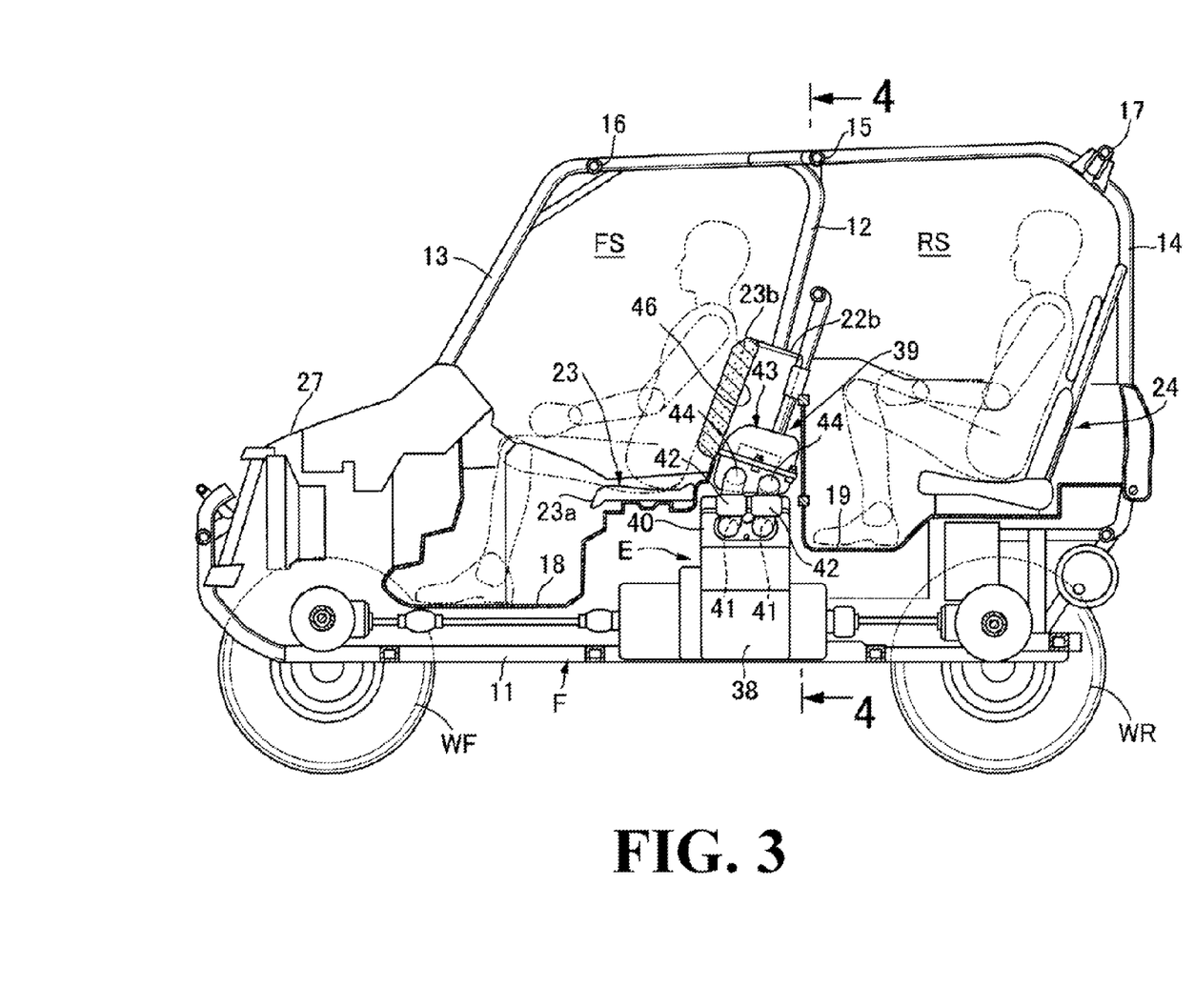
FIG. 3 is a cross-sectional view taken along line 3-3 in FIG. 2.

First, in FIGS. 1 to 3, a pair of left and right front wheels WF are suspended on a front part of a vehicle body frame F of a rough terrain four-wheeled vehicle, which is a four-wheeled vehicle, and a pair of left and right rear wheels WR are suspended on a rear part of the vehicle body frame F.

The vehicle body frame F includes a pair of left and right lower frames 11, a pair of left and right center upright frames 12, a pair of left and right front side frames 13, a pair of left and right rear side frames 14, a center cross member 15, a front cross member 16, and a rear cross member 17. The lower frames 11 extend in the front-rear direction. The center upright frames 12 rise upward from middle portions of the lower frames 11 in the front-rear direction. The front side frames 13 extend forward from the upper ends of the center upright frames 12, extend downwardly forward from the middle, and then join front portions of the lower frames 11. The rear side frames 14 extend rearward from the upper ends of the center upright frames 12, extend downward from the middle, and then join rear portions of the lower frames 11. The center cross member 15 links upper end portions of the pair of left and right center upright frames 12. The front cross member 16 links the middle bent portions of the pair of left and right front side frames 13. The rear cross member 17 links the middle bent portions of the pair of left and right rear side frames 14.

The pair of left and right center upright frames 12 and the pair of left and right front side frames 13 define the contour of a front seating space FS for a driver and a front passenger. A front floor 18 disposed in front of the center upright frames 12 is supported on the front part of the vehicle body frame F so that the driver and the front passenger can get on the vehicle. Moreover, the pair of left and right center upright frames 12 and the pair of left and right rear side frames 14 define the contour of a rear seating space RS for rear passengers. A rear floor 19 disposed behind the center upright frames 12 is supported on the rear part of the vehicle body frame F so that the rear passengers can get on the vehicle.

In the front seating space FS for the driver and the front passenger, a driver seat 21 and a passenger seat 22 are disposed away from each other in the vehicle width direction. The driver seat 21 is disposed behind a steering wheel 20 for steering the pair of left and right front wheels WF. The passenger seat 22 is disposed to the left or right of the driver seat 21 (to the right in this embodiment).

The driver seat 21 and the passenger seat 22 include seating parts 21a and 22a and seatback parts 21b and 22b rising upward from rear portions of the seating parts 21a and 22a, respectively. Moreover, between the driver seat 21 and the passenger seat 22, there is provided a second passenger seat 23 having a seatback part 23b which is displaced forward of the seatback parts 21b and 22b of the driver seat 21 and the passenger seat 22 and also having a seating part 23a which is disposed between the seating parts 21a and 22a of the driver seat 21 and the passenger seat 22. On the other hand, a pair of left and right rear seats 24 are provided in the rear seating space RS for the rear passengers.

Meanwhile, the front part of the vehicle body frame F is covered with a front cover 27, and front side covers 28, a pair of left and right center side covers 29, and a pair of left and right rear side covers 30 are attached to the vehicle body frame F. The front side covers 28 cover a rear lower portion of the front seating space FS from the lateral sides. The center side covers 29 cover a front lower portion of the rear seating space RS from the lateral sides. The rear side covers 30 covers a rear lower portion of the rear seating space RS from the lateral sides. Moreover, a pair of left and right front doors 33 are supported pivotally on left and right rear portions of the front cover 27 with pairs of upper and lower hinges 35 and 35, respectively. The front doors 33 are capable of opening and closing front doorways 31 formed between the front side covers 28 and the front cover 27, respectively. Rear doors 34 are supported pivotally on front portions of the rear side covers 30 with pairs of upper and lower hinges 36 and 36, respectively. The rear doors 34 are capable of opening and closing rear doorways 32 formed between the center side covers 29 and the rear side covers 30, respectively.

Figure 4:
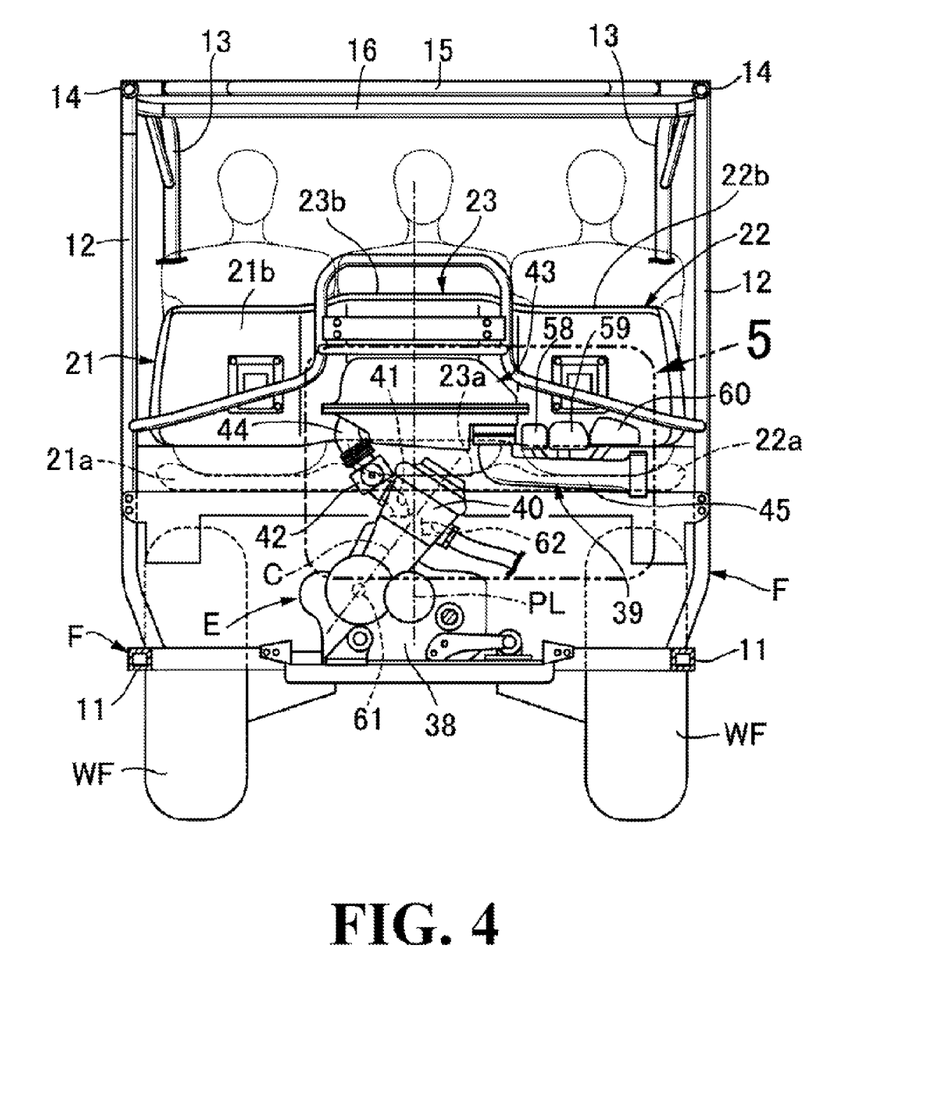
FIG. 4 is a cross-sectional view taken along line 4-4 in FIG. 3.
Figure 5:
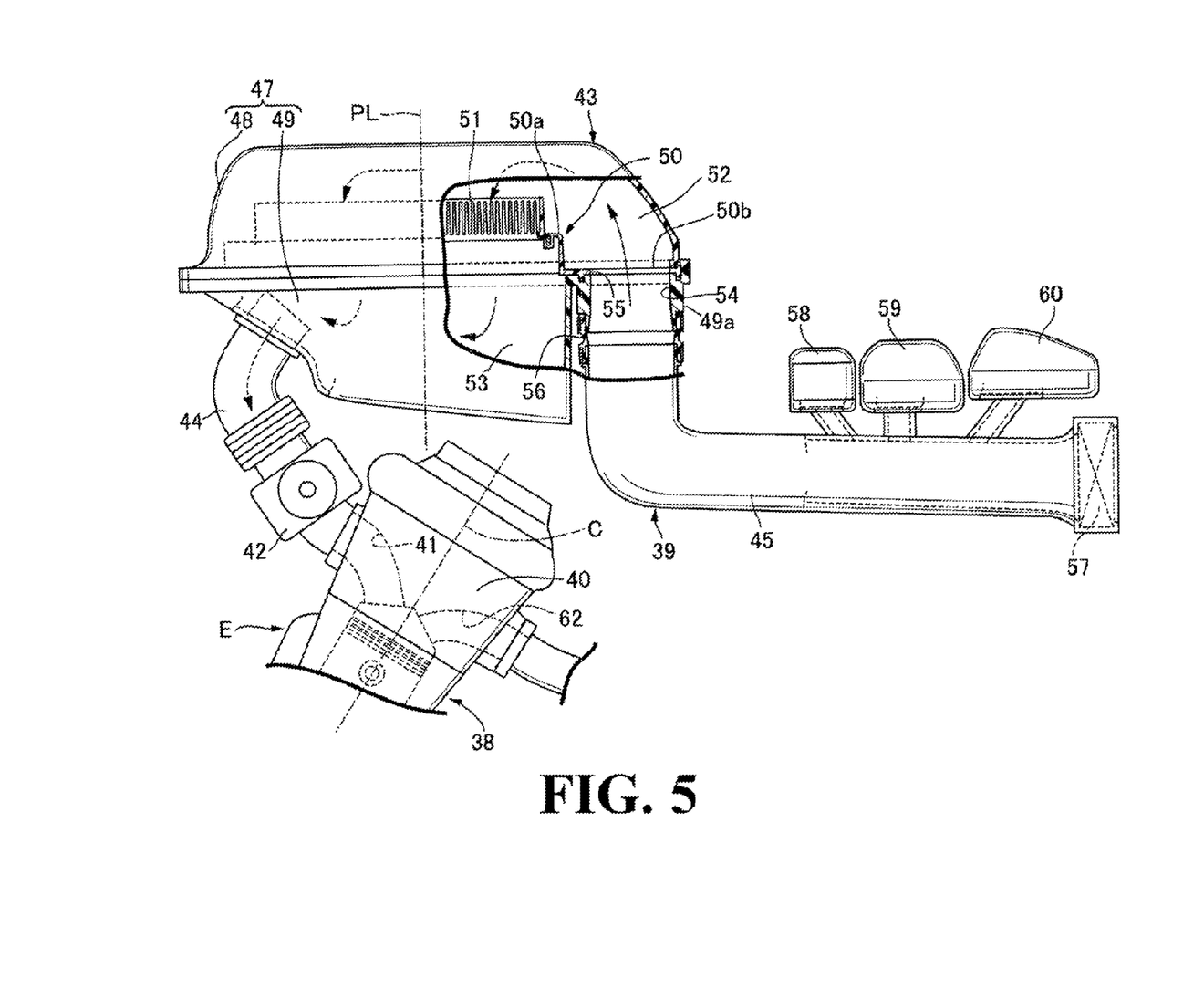
FIG. 5 is an enlarged partial cutaway view of an area indicated by arrow 5 in FIG. 4.

Referring also to FIGS. 4 and 5, a two-cylinder internal combustion engine E is mounted on the vehicle body frame F such that it is disposed substantially at the center in the front-rear direction of the vehicle in a plan view. The internal combustion engine E outputs power that rotationally drives the pair of left and right front wheels WF and the pair of left and right rear wheels WR. An engine body 38 of the internal combustion engine E is mounted on the vehicle body frame F in such a posture that the engine body 38 is placed longitudinally with the axis of its crankshaft 61 set along the front-rear direction and that a cylinder axis C is tilted in the vehicle width direction toward any one of the driver seat 21 and the passenger seat 22 (toward the passenger seat 22 in this embodiment). The engine body 38 is disposed at the center in the vehicle width direction below the driver seat 21 and the passenger seat 22.

Moreover, the engine body 38 is mounted on the vehicle body frame F such that the crankshaft 61 is disposed closer to the other of the driver seat 21 and the passenger seat 22 (closer to the driver seat 21 in this embodiment) than is a vertical plane PL extending along the center in the vehicle width direction. The cylinder axis C is tilted from the crankshaft 61 toward the center in the vehicle width direction.

An intake device 39 of the internal combustion engine E includes throttle bodies 42, an air cleaner 43, a pair of connecting tubes 44, and a single intake duct 45. The throttle bodies 42 are connected to intake ports 41 which are provided in a cylinder head 40 of the engine body 38 respectively for the cylinders. The air cleaner 43 is disposed between the driver seat 21 and the passenger seat 22 in the plan view. The connecting tubes 44 connect the throttle bodies 42 and the air cleaner 43. The intake duct 45 guides air to the air cleaner 43.

The air cleaner 43 is formed in an elongated shape in the vehicle width direction and is disposed between the seatback parts 21b and 22b of the driver seat 21 and the passenger seat 22. In addition, the seatback part 23b of the second passenger seat 23, provided between the driver seat 21 and the passenger seat 22, can be integral with the seatback parts 21b and 22b of the driver seat 21 and the passenger seat 22 and is displaced forward of the seatback parts 21b and 22b. Thus, the seatback parts 21b, 22b, and 23b of the driver seat 21, the passenger seat 22, and the second passenger seat 23 form a recess 46 sunk forwardly in the plan view, and the air cleaner 43 is disposed in the recess 46.

The air cleaner 43 includes: a cleaner case 47 formed of vertically splittable upper case half 48 and lower case half 49 fastened to each other; and a cleaner element 51 housed in the cleaner case 47 while being supported on an element holder 50 having its outer peripheral portion held between joining portions of the upper case half 48 and the lower case half 49. The cleaner element 51 is made of wet filter paper, for example.

The element holder 50 integrally includes: a support tube portion 50a formed in such a rectangular tube shape as to support the cleaner element 51; and a base plate portion 50b projecting laterally from one end portion of the support tube portion 50a. An outer edge portion of the base plate portion 50b is air-tightly held between the joining portions of the upper case half 48 and the lower case half 49.

Moreover, a pre-purification chamber 52 and a post-purification chamber 53 are formed inside the cleaner case 47 with the element holder 50 and the cleaner element 51 interposed therebetween. The pre-purification chamber 52 is where air is supplied from the intake duct 45. The post-purification chamber 53 communicates with the intake ports 41 through the connecting tubes 44 and the throttle bodies 42.

Meanwhile, the intake ports 41 of the engine body 38 are disposed closer to the other of the driver seat 21 and the passenger seat 22 (closer to the driver seat 21 in this embodiment) than is the vertical plane PL extending along the center in the vehicle width direction (see FIGS. 4 and 5). The connecting tubes 44 are connected a left lower portion of the cleaner case 47. Moreover, an ambient-air intake port 54 of the air cleaner 43 is disposed closer to the one of the driver seat 21 and the passenger seat 22 (closer to the passenger seat 22 in this embodiment) than is the vertical plane PL extending along the center in the vehicle width direction. The ambient-air intake port 54 is formed by a downwardly extending connecting pipe 49a provided on the right side of the lower case half 49 of the cleaner case 47. In addition, the base plate portion 50b of the element holder 50 is provided with a through-hole 55 open in a circular shape corresponding to the ambient-air intake port 54.

Figure 6:
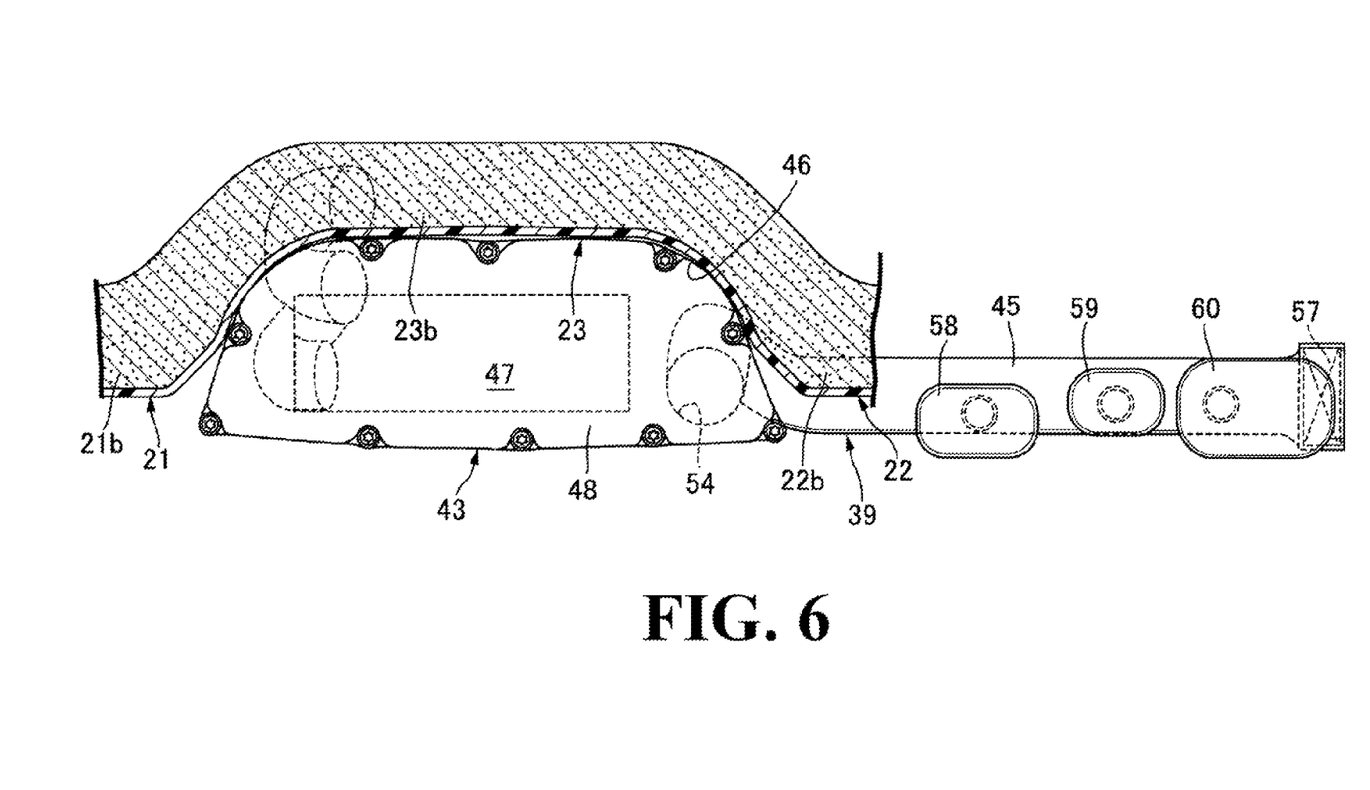
FIG. 6 is a horizontal cross-sectional view of a part of seatback parts of a driver seat, a passenger seat, and a second passenger seat as seen in the direction of arrow 6 in FIG. 3.

Referring also to FIG. 6, the downstream end of the intake duct 45 is connected to the ambient-air intake port 54 of the air cleaner 43 by a cylindrical joint member 56. The intake duct 45 extends to a side portion of the vehicle body along the seatback part of the other of the driver seat 21 and the passenger seat 22 (the seating part 22b of the passenger seat 22 in this embodiment).

Moreover, since the cylinder axis C of the engine body 38 is tilted to the right, exhaust ports 62 of the engine body 38 are disposed in a location which is below and relatively far from the intake duct 4. Accordingly, the influence of heat on the intake duct 45 can be reduced.

A pre-filter 57 made of dry urethane is detachably set at the upstream end of the intake duct 45 so as to remove relatively large foreign materials, such as fallen leaves, snow, straws, and dandelion seeds. Moreover, resonators 58, 59, and 60 are connected to the intake duct 45 in multiple locations.

Next, operation of this embodiment will be described. The driver seat 21 and the passenger seat 22 are disposed away from each other in the vehicle width direction; and the air cleaner 43 constituting a part of the intake device 39 of the internal combustion engine and formed in an elongated shape in the vehicle width direction is disposed between the driver seat 21 and the passenger seat 22 in the plan view. Accordingly, the volume of the air cleaner 43 can be increased and secured without making the air cleaner 43 affect peripheral components such as the front wheels WF, the rear wheels WR, and the suspension and also without increasing the number of components.

Moreover, the engine body 38 of the internal combustion engine E is disposed at the center in the vehicle width direction, below the driver seat 21 and the passenger seat 22. Thus, the distance between the engine body 38 and the air cleaner 43 is reduced, thereby shortening the intake passage. Accordingly, the size of the internal combustion engine E as a whole can be reduced.

Also, the driver seat 21 and the passenger seat 22 include the seating parts 21a and 22a and the seatback parts 21b and 22b rising upward from the rear portions of the seating parts 21a and 22a, respectively; and the air cleaner 43 is disposed between the seatback parts 21b and 22b of the driver seat 21 and the passenger seat 22. Thus, the space created between the seatback parts 21b and 22b of the driver seat 21 and the passenger seat 22 is effectively utilized for disposing the air cleaner 43. Accordingly, the volume of the air cleaner 43 can be increased.

In addition, the second passenger seat 23 having the seatback part 23b which is displaced forward of the seatback parts 21b and 22b of the driver seat 21 and the passenger seat 22 is provided between the driver seat 21 and the passenger seat 22. Thus, the seatback parts 21b, 22b, and 23b of the driver seat 21, the passenger seat 22, and the second passenger seat 23 form the recess 46 sunk forwardly in plan view, and the air cleaner 43 is disposed in the recess 46. Hence, a dead space in the vehicle is effectively utilized for disposing the air cleaner 43. Accordingly, the volume of the air cleaner 43 can be further increased.

Further, the intake ports 41 of the engine body 38 are disposed closer to the driver seat 21 than is the vertical plane PL extending along the center in the vehicle width direction, whereas the ambient-air intake port 54 of the air cleaner 43 is disposed closer to the passenger seat 22 than is the vertical plane PL extending along the center in the vehicle width direction. Thus, the air cleaner 43 is elongated in the vehicle width direction between the seatback parts 21b and 22b of the driver seat 21 and the passenger seat 22. Accordingly, while the volume of the air cleaner 43 is secured, the intake passage is bent to a lesser extent, thereby making it possible to improve the intake efficiency.

Furthermore, the intake duct 45 extending to the side portion of the vehicle body along the seatback part of the other of the driver seat 21 and the passenger seat 22 (the seatback part 22b of the passenger seat 22) is connected to the ambient-air intake port 54 of the air cleaner 43. Thus, the intake duct 45 is bent to a lesser extent, thereby making it possible to further enhance the intake efficiency.

Hereinabove, an embodiment of the present invention has been described. However, the present invention is not limited to the above embodiment, and various design changes can be made without departing from the present invention described in the scope of claims.

For example, the present invention is not limited to rough terrain four-wheeled vehicles but is applicable to a wide range of four-wheeled vehicles.

We claim:

1. A four-wheeled vehicle, comprising:
   a vehicle body frame,
   a driver seat and a passenger seat disposed side by side on said vehicle body frame in a vehicle width direction,
   an internal combustion engine disposed on said vehicle body frame substantially at a center of said vehicle in a front-rear direction,
   an air intake device for said internal combustion engine, said air intake device including an air cleaner, and
   a second passenger seat provided between said driver seat and said passenger seat,
   wherein said driver seat and said passenger seat are spaced from each other in the vehicle width direction,
   wherein said air cleaner is formed in an elongated shape in the vehicle width direction, and
   wherein said air cleaner is disposed between said driver seat and said passenger seat,
   wherein an engine body of said internal combustion engine is disposed below said driver seat and said passenger seat and is disposed at a center of said vehicle, in the vehicle width direction,
   wherein said driver seat and said passenger seat each include a seating part and a seatback part rising upward from a rear portion of said seating part,
   wherein said air cleaner is disposed between said seatback parts of said driver seat and said passenger seat, and
   wherein a seatback part of said second passenger seat is displaced forward of said seatback parts of said driver seat and said passenger seat.

2. The four-wheeled vehicle according to claim 1,
   wherein said engine body is mounted on said vehicle body frame such that said engine body is disposed longitudinally such that an axis of a crankshaft of said engine body is disposed in a front-rear vehicle direction,
   wherein a cylinder axis of said engine body is tilted in the vehicle width direction toward a first one of said driver seat and said passenger seat,
   wherein an intake port of said engine body is disposed closer to a second one of said driver seat and passenger seat than is a vertical plane extending along the center of said vehicle, in the vehicle width direction, and
   wherein an ambient-air intake port of said air cleaner is disposed closer to the first one of said driver seat and said passenger seat than is the vertical plane.

3. The four-wheeled vehicle according to claim 2,
   wherein an intake duct is connected to said ambient-air intake port said of said air cleaner, and
   wherein said intake duct extends to a side portion of a vehicle body along said seatback part of the first one of said driver seat and said passenger seat.

* * * * *